United States Patent [19]

Pettinichi

[11] Patent Number: 5,439,382
[45] Date of Patent: Aug. 8, 1995

[54] METHOD OF TEACHING/LEARNING A PART OF A MULTI-PART MUSICAL COMPOSITION

[76] Inventor: Ruth A. Pettinichi, 50 Spring St., Kingston, N.Y. 12401

[21] Appl. No.: 184,847

[22] Filed: Jan. 21, 1994

Related U.S. Application Data

[62] Division of Ser. No. 860,990, Mar. 31, 1992, abandoned.

[51] Int. Cl.⁶ .............................................. G09B 5/04
[52] U.S. Cl. ................................................... 434/319
[58] Field of Search ......................................... 434/319

[56] References Cited

U.S. PATENT DOCUMENTS

| | | | |
|---|---|---|---|
| 1,653,458 | 12/1927 | Green | . |
| 2,153,027 | 4/1939 | Ross | 434/319 X |
| 2,519,103 | 8/1950 | Block | 434/319 X |
| 3,601,904 | 8/1971 | Elliott, Jr. et al. | . |
| 3,955,466 | 5/1976 | Goldmark | 434/319 X |

*Primary Examiner*—Gene Mancene
*Assistant Examiner*—Jeffrey A. Smith
*Attorney, Agent, or Firm*—Heslin & Rothenberg

[57] ABSTRACT

The invention provides an apparatus which comprises a recording of a musical composition having two or more parts. One of the two or more parts is at a volume audibly louder than an audible volume of the other parts when the recording of the musical composition is reproduced. This part at a louder volume is the part to be learned efficiently and accurately. The musical composition may comprise instrumental and vocal parts in any combination, and the part to be learned (and therefore at a louder volume) can be an instrumental or vocal part. Methods of making the apparatus and methods of using the apparatus are also provided.

5 Claims, No Drawings

METHOD OF TEACHING/LEARNING A PART OF A MULTI-PART MUSICAL COMPOSITION

This application is a division of application Ser. No. 07/860,990, filed Mar. 31, 1992 abandoned.

FIELD OF THE INVENTION

The present invention primarily relates to a musical teaching aid, and more particularly to an apparatus and method for teaching a person to play or sing a part in a multi-part musical composition.

BACKGROUND OF THE INVENTION

It is well known that for any musician, whether a professional or student, practice is necessary to master a part in a musical composition. The most common way to practice is to perform your part of the composition along with the performance of the rest of the parts in the composition by the other members of the musical group. This type of practice has certain drawbacks. First, it is often difficult to find a time and place to get all the members of a musical group together to perform the multi-part musical composition. Second, since some performing members need more practice than others, a few members could hold back the progress of the entire group.

Practicing unaccompanied by the other members of the musical group is an alternative to playing with the entire group to learn a part of a musical composition. For example, U.S. Pat. No. 2,153,027 issued Apr. 4, 1939 to Ross discloses learning by performance along with a recording in which the melody (the part to be played live and to be learned) is recorded at a lower level than the accompaniment. Furthermore, U.S. Pat. No. 1,653,458 issued Dec. 20, 1927 to Green discloses learning by listening to a part to be learned in isolation, without accompaniment or other parts.

In the field of music, a need for an efficient and accurate way to learn a part of a multi-part musical composition is always useful. An apparatus and method which provides efficient and accurate learning beyond the apparatuses and methods presently available is desired.

SUMMARY OF THE INVENTION

This need is met by the apparatus and method of the subject invention.

The main component of the apparatus of the subject invention is a recording of a musical composition having two or more parts. One of the two or more parts is at a volume audibly louder than an audible volume of the other parts when the recording of the musical composition is reproduced. This part at a louder volume is the part to be learned efficiently and accurately. The musical composition may comprise instrumental and vocal parts in any combination, and the part to be learned (and therefore at a louder volume) can be an instrumental or vocal part. In one embodiment, the part to be learned is a single vocal part and the other parts of the musical composition comprise the instrumental parts of the accompaniment.

The recording is reproduced, and by listening and/or practicing with the recording of the musical teaching apparatus, a part is learned much more efficiently and accurately than preceding musical teaching methods allowed. The recording can be on any suitable medium, including but not limited to phonorecords, laser discs, compact discs, cassette tapes, and reel to reel tapes. Any medium suitable for recording known to those skilled in the musical art can be utilized in the subject invention. The choice of means for reproducing the recording depends upon the recording medium chosen. For example, suitable means could be a turntable for a phonorecord, a laser disc player for a laser disc, a compact disc player for a compact disc, a cassette player for a cassette tape, or a reel to reel tape player for a reel to reel tape.

In another embodiment, the recording can be on more modern mediums such as videocassettes and computer discs, reproduced on a videocassette recorder and a computerized synthesizer, respectively. The videocassettes allow the advantage of a video component accompanying the audio component. This is useful where, for example, a part is learned which will be played with a marching band. Thus, the audio portion of the videocassette can be used according to the subject invention while the video portion simultaneously teaches the physical (marching) accompaniment for the musical composition. The invention could also be extended to the video portion, wherein the marching part to be learned is amplified or "louder" in the video portion (i.e. colored reproduction of the part to be learned superimposed on a black and white reproduction of the other marching parts).

The apparatus of the subject invention is preferably made by superimposing one recording over another at a louder volume. Any means known to those skilled in the art for such superimposed recording can be used.

DETAILED DESCRIPTION OF THE INVENTION

The present invention provides a method and apparatus for teaching a part in a multi-part musical composition more quickly and proficiently than previous methods and apparatuses.

The present apparatus generally comprises a recording of a multi-part musical composition in which a single musical part of the composition is recorded at a louder audible level than all other parts of that composition. The multi-part musical composition has at least two parts. For example, a musical composition could have four vocal parts, including soprano, alto, tenor and bass. The multi-part musical composition could also have one or more instrumental parts, forming an accompaniment. As will be readily apparent to those skilled in the art, the musical composition can also be any combination of vocal and instrumental parts. Preferably, a single vocal part is recorded at a louder audible volume than the instrumental accompaniment.

The musical part that is to be learned, whether vocal or instrumental, is audibly louder than all other parts on the recording when reproduced. Thus, if someone wanted to learn the alto part of a composition comprising four vocal parts, the reproduction of the alto part on the recording would be louder than all other parts, namely the soprano, tenor and bass. The musical part to be learned should be recorded such that when the recording is played or reproduced the part to be learned will sound louder than it would normally be heard. This part should preferably dominate the recording but it should not drown out the remaining parts or the accompaniment to the extent they are not clearly audible and distinguishable.

Several recordings can be made so that every part of the multi-part musical composition could be learned. This would allow for each member of a group to practice and learn their particular part of the composition on an individual basis. Furthermore, there could be a centralized memory bank of commercially available recorded parts. One recording medium (such as a cassette tape or videocassette) could be purchased with, for instance, the alto part of several multi-part musical compositions recorded thereon, for use i learning the alto part of the compositions for a particular concert.

It should be readily apparent to those skilled in the art that the musical teaching apparatus for a multi-part musical composition can comprise a recording at a preselected volume of one part of a multi-part musical composition, with a superimposed recording at a volume fainter than the preselected volume of other parts of the multi-part musical composition. Alternatively, the musical teaching apparatus could comprise a recording at a preselected volume of one or more parts of the multi-part musical composition, with a superimposed recording at a louder volume than the preselected volume of a further part of the multi-part musical composition.

The present invention may be made upon any suitable audio reproduction means as discussed above, and the method of making the present invention may be accomplished by any of several well-known recording means. For example, the desired part may simply be played louder during recording or simply recorded at a louder level through the use of multiple microphones and a mixing board. In addition, the desired part could be recorded at a louder level with the use of multi-tract sound equipment. If video equipment is used, the same principles apply.

One such method of making a musical teaching apparatus for a multi-part musical composition, according to the subject invention, comprises recording at a preselected volume one part of a multi-part musical composition. Then, a recording at a volume fainter than the preselected volume of other parts of the multi-part musical composition is superimposed over the one part. Alternatively, the method of making can comprise recording at a preselected volume one or more parts of a multi-part musical composition. Then, a recording at a louder volume than the preselected volume of a further part of the multi-part musical composition is superimposed over the one or more parts.

The resulting musical teaching apparatus of the present invention may be used by either listening to the recording having the desired part emphasized or by playing or singing along with the recording. For example, a student would first carefully listen to the recording and then play or sing along with that same recording and repeat these steps until the part to be learned is mastered.

Accordingly, one method of using the musical teaching apparatus is using it to learn a part of a multi-part musical composition. The method of learning may comprise listening to a recording at a preselected volume of one part of a multi-part musical composition, and listening simultaneously to a recording at a volume fainter than the preselected volume of other parts of the multi-part musical composition superimposed over the one part, wherein the one part recorded at the preselected volume is learned. Alternatively, the method of learning may comprise listening to a recording at a preselected volume of one or more parts of a multi-part musical composition, and listening simultaneously to a recording at a louder volume than the preselected volume of a further part of the multi-part musical composition superimposed over the one or more parts, wherein the further part recorded at a louder volume is learned.

Just as the musical teaching apparatus can be used to learn a part of a multi-part musical composition, the musical teaching apparatus concept can be used to teach a part of a multi-part musical composition. The method of teaching may comprise recording at a preselected volume one part of a multi-part musical composition, so as to obtain a first recording. Then, a recording at a volume fainter than the preselected volume of other parts of the multi-part musical composition is superimposed over the one part of the first recording, so as to obtain a second recording. The subject being taught then listens to the second recording, and repeats this listening step so as to learn the one part recorded at the preselected volume. Alternatively, the method of teaching may comprise recording at a preselected volume one or more parts of a multi-part musical composition, so as to obtain a first recording. Then, a recording at a louder volume than the preselected volume of a further part of the multi-part musical composition is superimposed over the one or more parts, so as to obtain a second recording. The subject being taught then listens to the second recording, and repeats this listening step so as to learn the one part recorded at the louder volume.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of learning a part of a multi-part musical composition, the method comprising:
   listening to a recording of a multi-part musical composition, said recording having one part of said composition recorded at a preselected volume, said recording having the remaining parts of said composition recorded at a volume fainter than the preselected volume of said one part; and
   wherein said one part recorded at said preselected volume is learned.

2. A method of learning a part of a multi-part musical composition, the method comprising:
   listening to a recording of a multi-part musical composition, said recording having one or more parts of said composition recorded at a preselected volume, said recording having a further part of said composition recorded at a louder volume than the preselected volume of said one or more parts; and
   wherein said further part recorded at a louder volume is learned.

3. A method of teaching a part of a multi-part musical composition, the method comprising:
   recording at a preselected volume one part of a multi-part musical composition, so as to obtain a first recording;
   recording at a volume fainter than said preselected volume other parts of said multi-part musical composition superimposed over said one part of said first recording, so as to obtain a second recording and;
   requiring a student to listen at least once to said second recording so as to facilitate said student to learn said one part recorded at said preselected volume.

4. A method of teaching a part of a multi-part musical composition, the method comprising:

recording at a preselected volume one or more parts of a multi-part musical composition, so as to obtain a first recording;

recording at a louder volume than said preselected volume a further part of said multi-part musical composition superimposed over said one or more parts, so as to obtain a second recording and;

requiring a student to listen at least once to said second recording so as to facilitate said student to learn said one part recorded at said louder volume.

5. A method of teaching a part of a multi-part musical composition, the method comprising:

requiring a student to listen at least once to a recording of a multi-part musical composition, said recording having one part of said composition recorded at a preselected volume, said recording having the remaining parts of said composition recorded at a volume fainter than the preselected volume of said one part.

* * * * *